United States Patent
Clarke et al.

(10) Patent No.: US 11,998,868 B2
(45) Date of Patent: Jun. 4, 2024

(54) CONFINED SPACE SEALING SYSTEM AND METHOD

(71) Applicant: Jonell Filtration Products, Inc., Breckinridge, TX (US)

(72) Inventors: Alan Lee Clarke, Mineral Wells, TX (US); Schuyler Steven Smith, Santo, TX (US)

(73) Assignee: JONELL FILTRATION PRODUCTS, INC., Breckinridge, TX (US)

( * ) Notice: Subject to any disclaimer, the term of this patent is extended or adjusted under 35 U.S.C. 154(b) by 648 days.

(21) Appl. No.: 17/125,136

(22) Filed: Dec. 17, 2020

(65) Prior Publication Data

US 2021/0178310 A1 Jun. 17, 2021

Related U.S. Application Data

(60) Provisional application No. 62/949,208, filed on Dec. 17, 2019.

(51) Int. Cl.
*B25B 27/00* (2006.01)
*B01D 35/02* (2006.01)
(Continued)

(52) U.S. Cl.
CPC ......... *B01D 46/4227* (2013.01); *B01D 35/02* (2013.01); *B01D 46/0004* (2013.01);
(Continued)

(58) Field of Classification Search
CPC ........ B25B 13/06; B25B 27/00; B25B 27/143
See application file for complete search history.

(56) References Cited

U.S. PATENT DOCUMENTS 4,459,716 A * 7/1984 Valadez ................ B25B 13/483
7/164
5,992,518 A 11/1999 Whitlock
(Continued)

FOREIGN PATENT DOCUMENTS

EP 2241361 B1 11/2011

OTHER PUBLICATIONS

International Search Report filed in PCT/US2020/065667 dated Apr. 14, 2021, 3 pages.
(Continued)

*Primary Examiner* — Lee D Wilson
(74) *Attorney, Agent, or Firm* — Vedder Price P.C.

(57) ABSTRACT

A method of securing a filter element within a pressure vessel without a user breaching a plane of the pressure vessel is provided. The method includes attaching a filter locking nut to a removal/installation tool, wherein the removal/installation tool comprises an elongated body, inserting the filter locking nut into the pressure vessel, securing the filter locking nut to a threaded rod to secure a filter element in place, detaching the removal/installation tool from the filter locking nut, and removing the removal/installation tool from the pressure vessel. At least a portion of the elongated body of the removal/installation tool extends outside of the pressure vessel for the duration of the attaching, inserting, securing, detaching, and removing steps.

5 Claims, 6 Drawing Sheets

(51) Int. Cl.
  *B01D 46/00* (2022.01)
  *B01D 46/42* (2006.01)
(52) U.S. Cl.
  CPC .......... *B25B 27/00* (2013.01); *B01D 2201/24* (2013.01); *B01D 2265/029* (2013.01)

(56) References Cited

U.S. PATENT DOCUMENTS

| | | | | |
|---|---|---|---|---|
| 6,729,208 | B1 * | 5/2004 | Chrzanowski | B25B 27/18 81/53.2 |
| 6,889,580 | B1 * | 5/2005 | Tseng | B25B 23/0035 411/408 |
| 7,096,766 | B2 * | 8/2006 | Hsieh | B25B 23/0035 81/121.1 |
| 7,127,969 | B2 * | 10/2006 | Hsieh | B25B 13/06 81/120 |
| 8,752,454 | B2 * | 6/2014 | Friend | B25B 13/48 81/53.2 |
| 9,151,432 | B1 * | 10/2015 | Yoder | F16L 57/005 |
| D825,299 | S * | 8/2018 | Stalter | D8/21 |
| 2010/0224065 | A1 | 9/2010 | Clarke et al. | |
| 2011/0069802 | A1 | 3/2011 | Ketcham et al. | |
| 2013/0055693 | A1 | 3/2013 | Clarke et al. | |
| 2014/0165516 | A1 | 6/2014 | Clarke et al. | |
| 2017/0144094 | A1 | 5/2017 | Dye et al. | |
| 2018/0345192 | A1 | 12/2018 | Clarke et al. | |
| 2021/0178310 | A1 * | 6/2021 | Clarke | B01D 46/0004 |

OTHER PUBLICATIONS

Written Opinion of the International Searching Authority filed in PCT/US2020/065667 dated Apr. 14, 2021, 4 pages.
Jonell, Inc.; Rapid-LOK Retention Plate; product brochure; date unknown; 4 pages; United States.

* cited by examiner

CONFINED SPACE SEALING SYSTEM AND METHOD

RELATED APPLICATIONS AND INCORPORATION BY REFERENCE

This application claims benefit of and priority to U.S. provisional patent application Ser. No. 62/949,208 filed Dec. 17, 2019. The foregoing application, and all documents cited therein or during its prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE DISCLOSURE

The present disclosure generally relates to installation and removal of industrial filter elements in confined spaces.

BACKGROUND OF THE INVENTION

There are a number of applications in which it is necessary to remove solids or liquids from a gas stream, liquid stream, or multi-phase stream. As a non-limiting example, solid or liquid contaminants may be present in various gas or liquid streams of a refrigeration system. As another non-limiting example, gas pipelines many times contain solid or liquid contaminants.

Various apparatus and methods for removing solids and/or liquids from gas streams are well known. Quite commonly, gas filter elements are utilized for filtering dry gas streams as well as for separating solids and liquids from contaminated gas streams, or for coalescing entrained liquids from a gas stream. Often, these types of gas filter elements are installed in multi-stage vessels, which are in turn installed in a gas pipeline, to perform these filtering functions.

These filter elements are generally disposable and only have a finite lifespan. Thus, standard maintenance includes regular installation and removal of these filter elements. The installation/removal process can be cumbersome due to the location of these filter elements in "confined spaces" as defined and governed by Occupational Safety and Health Administration (OSHA) regulations. For example, OSHA Regulation 29 CFR 1910.146 (and other similar regulations) requires certain safeguards whenever a person crosses or breaks the plane of a confined space, such as a pressure vessel. Even if just a hand breaks the plane, defined by an opening of a confined space or vessel, the OSHA regulation applies. These regulations require three employees using self-contained breathing apparatuses to be present when entering a confined space. This of course increases the cost of maintenance and decreases efficiency.

Thus, there exists a need for apparatus and systems that can easily and effectively install and remove filter elements without breaching the plane of a confined space.

BRIEF SUMMARY OF THE INVENTION

In one aspect of the present disclosure, a filter locking nut is provided. The filter locking nut may include an elongated body extending between a first end and a second end. The first end comprises a first receptacle, wherein the first receptacle is configured to removably engage an elongated tool. The second end comprises a second receptacle, wherein the second receptacle comprises an internal thread configured to removably engage a threaded rod. In one embodiment, the filter locking nut may include a flange that extends laterally from the elongated body.

In another aspect of the present disclosure, a method of securing a filter element within a pressure vessel without a user breaching a plane of the pressure vessel is provided. The method comprises attaching a filter locking nut to a removal/installation tool, wherein the removal/installation tool comprises an elongated body, inserting the filter locking nut and a distal end of the removal/installation tool into the pressure vessel, and securing the filter locking nut to a threaded rod to secure a filter element in place. The method further comprises detaching the removal/installation tool from the filter locking nut and removing the removal/installation tool from the pressure vessel. At least a portion of the elongated body of the removal/installation tool extends outside of the pressure vessel for the duration of the attaching, inserting, securing, detaching, and removing steps.

BRIEF DESCRIPTION OF THE DRAWINGS

The disclosure will be more readily understood in view of the following description when accompanied by the below figures and wherein like reference numerals represent the elements, wherein.

DETAILED DESCRIPTION OF THE INVENTION

Figure 1A:
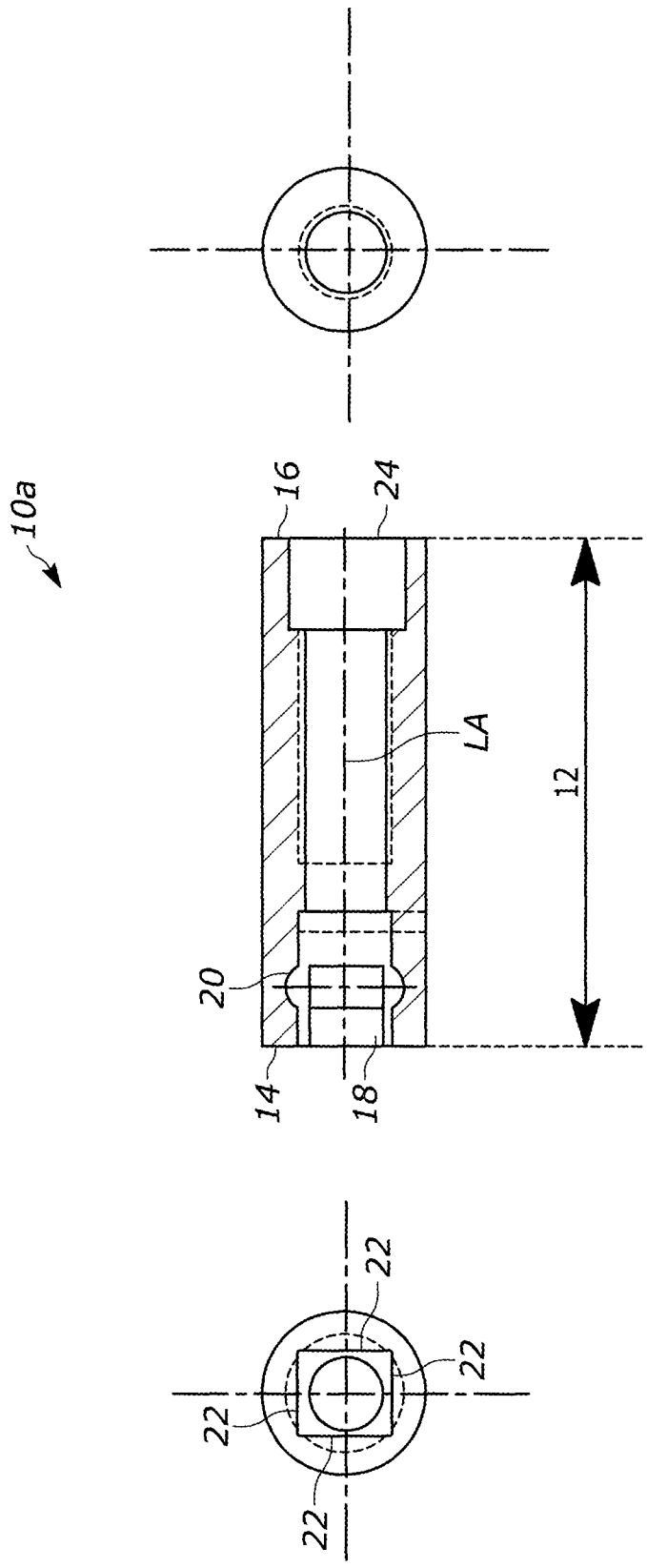
FIG. 1A is a depiction of one embodiment of a filter locking nut.

The following disclosure as a whole may be best understood by reference to the provided detailed description when read in conjunction with the accompanying drawings, drawing description, abstract, background, field of the disclosure, and associated headings. Identical reference numerals when found on different figures identify the same elements or a functionally equivalent element. The elements listed in the abstract are not referenced but nevertheless refer by association to the elements of the detailed description and associated disclosure.

FIG. 1A shows one embodiment of a filter locking nut 10a. The filter locking nut 10 may have a generally elongated body 12 having a first end 14 and a second end 16. In this embodiment the generally elongated body 12 is cylindrical in shape, although the disclosure is not so limited. The first end 14 may include a first receptacle 18 with a square shape and having a groove or an indentation 20 on each of the four inside walls 22. The indentations 20 may be configured to engage the spring ball of a standard square drive commonly found on a socket wrench or an extension therefor when the wrench is inserted into the first receptable 18. While this embodiment utilizes a first receptable 18 with indentations 20, the disclosure is not so limited. The first receptacle 18 may vary in design so long as the receptacle 18 is configured to removably engage an elongated removal/installation tool, such as a wrench. The second end 16 may include a second receptable 24. The second receptable 24 may be internally threaded such that it matches the thread of a threaded rod that holds a filter element in place. In this non-limiting example, internal threading of the second receptacle 24 may be achieved by machining the thread directly into the filter locking nut 10 or alternatively by gluing or otherwise attaching a threaded coupling nut within the second receptacle 24.

Figure 1B:
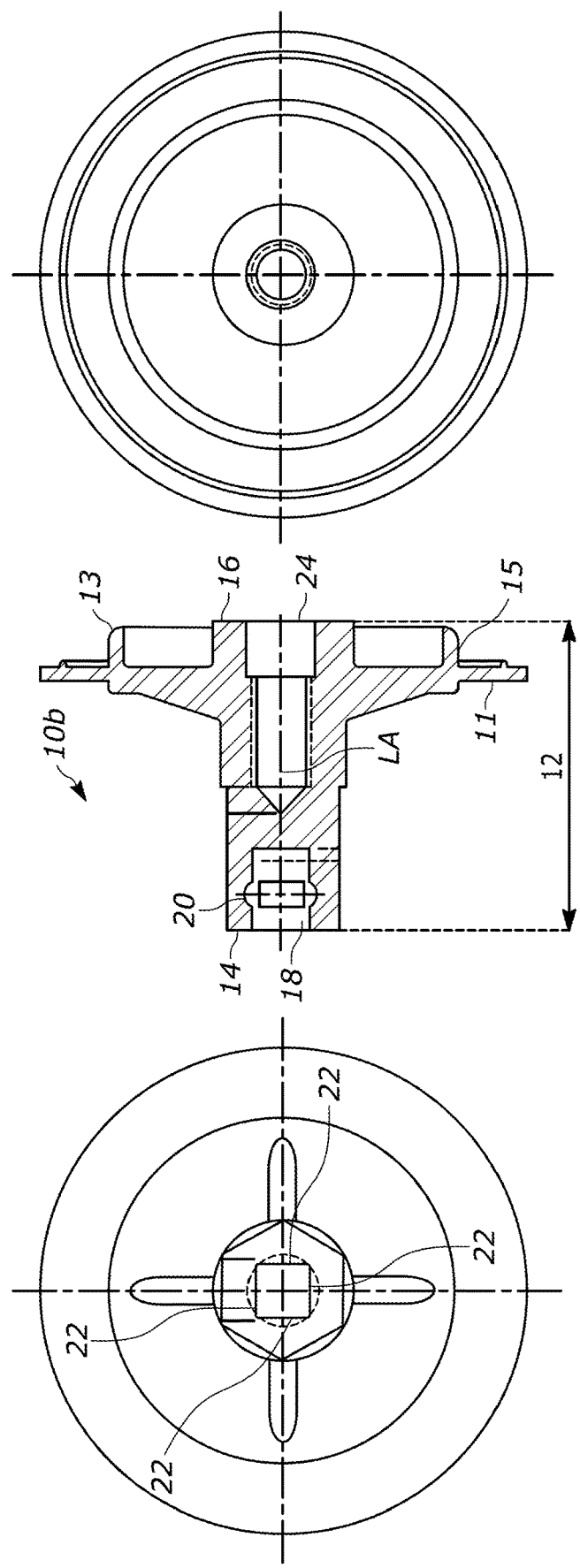
FIG. 1B is a depiction of another embodiment of the filter locking nut.

FIG. 1B shows another embodiment of a filter locking nut 10b. One of skill in the art will recognize that the filter locking nut 10b of this embodiment is substantially similar to the filter locking nut 10a. As a result, a description of the similar structure and functionality will not be repeated here, but will be incorporated herein by this reference. A flange 11 extends laterally from the longitudinal axis of elongated body 12. This is advantageous for use in connection with filter elements that do not include an integral or attached sealing cap. A wall 13 extends from the flange 11 along the longitudinal axis of the elongated body 12 to define a shoulder 15 therebetween. One of skill in the art will recognize that the shoulder 15 is advantageous to receive and position the filter element relative to the filter locking nut 10b and a base within the pressure vessel in order to achieve a quality seal. As mentioned above, otherwise the filter locking nut 10b includes all of the same structure and functionality as described with respect to the filter locking nut 10a.

Figure 2:
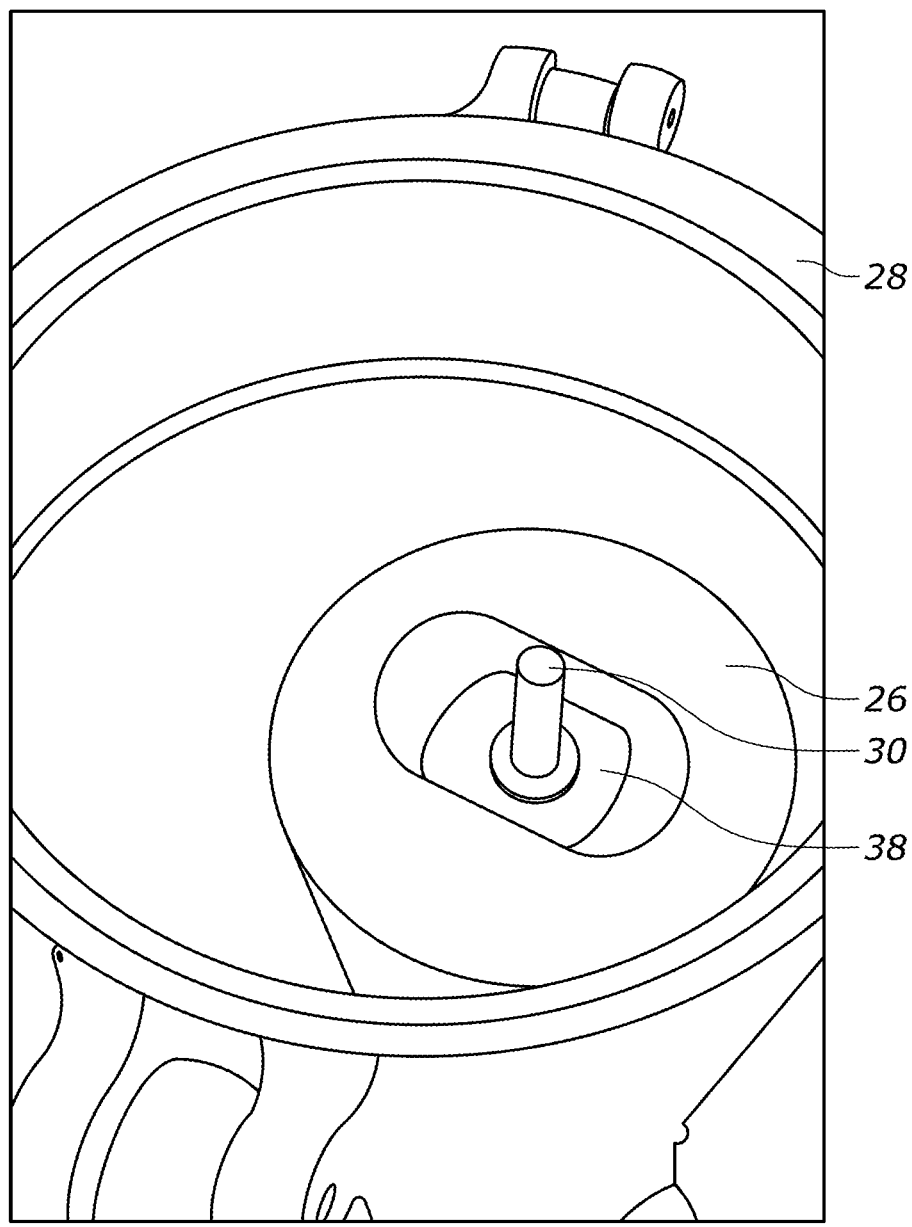
FIG. 2 is an image of a filter element placed within a pressure vessel.

Use of the filter locking nut 10a will now be described with reference to FIGS. 2-5. FIG. 2 shows an elongated filter element 26 disposed within a pressure vessel 28. The elongated filter element 26 includes a channel running through the middle of the elongated filter element 26 that is enclosed on one end by an integral or attached sealing cap that is configured to receive a threaded rod 30. As can be seen, the filter element 26 is contained entirely within the pressure vessel 28 such that no portion of the filter element 26 extends outside of the pressure vessel 28. Thus, in order to previously remove/install the filter element 26 into the pressure vessel 28, one must reach at least one hand into the pressure vessel 28. When reaching a hand into the pressure vessel 28, OSHA regulations for "confined spaces" as described above must be followed. To avoid reaching a hand into the pressure vessel (and also avoid OSHA regulations), an elongated filter removal/installation tool 32 may be used.

Figure 3:
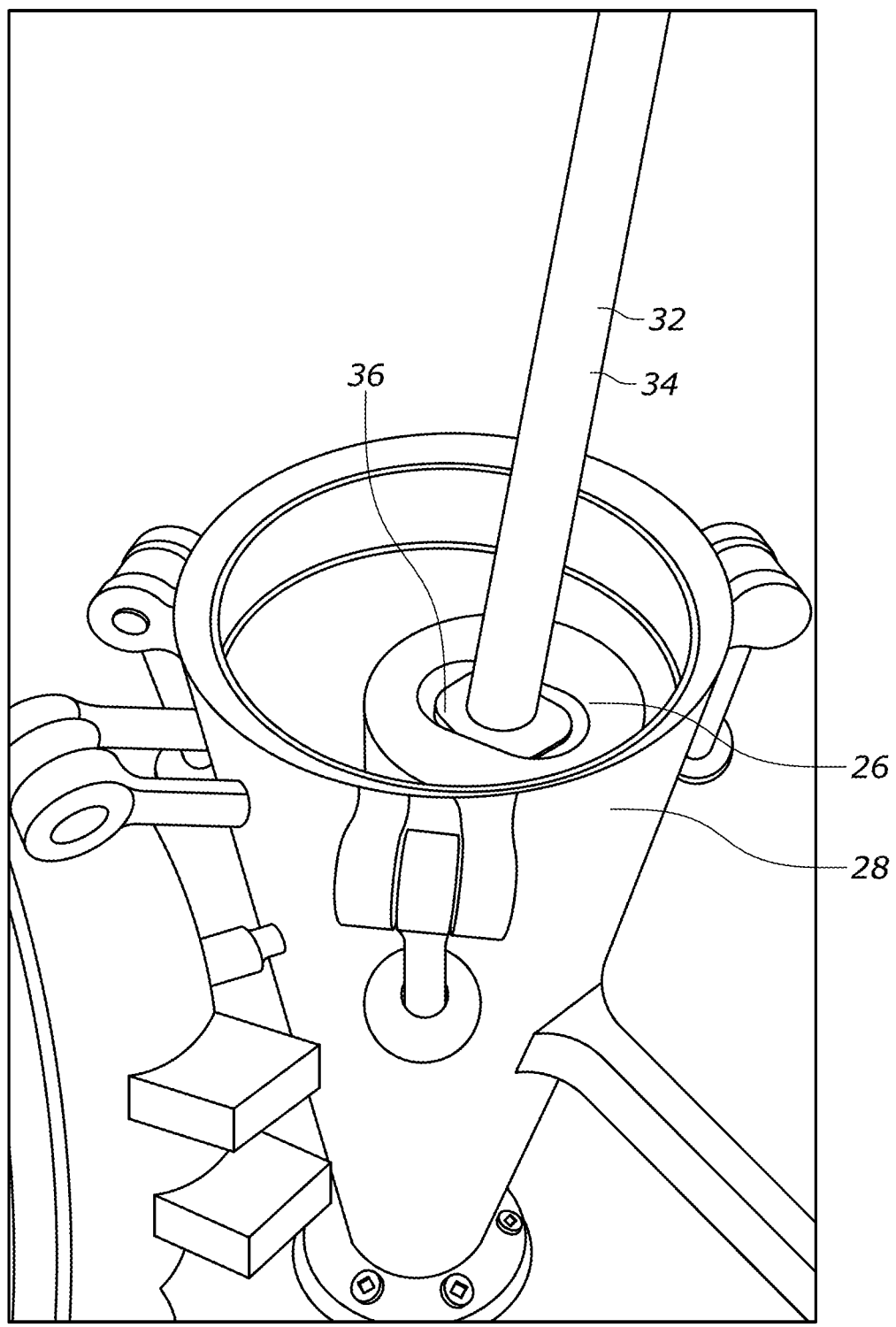
FIG. 3 is an image of a filter installation/removal tool in use with a filter element within a pressure vessel.
Figure 4:
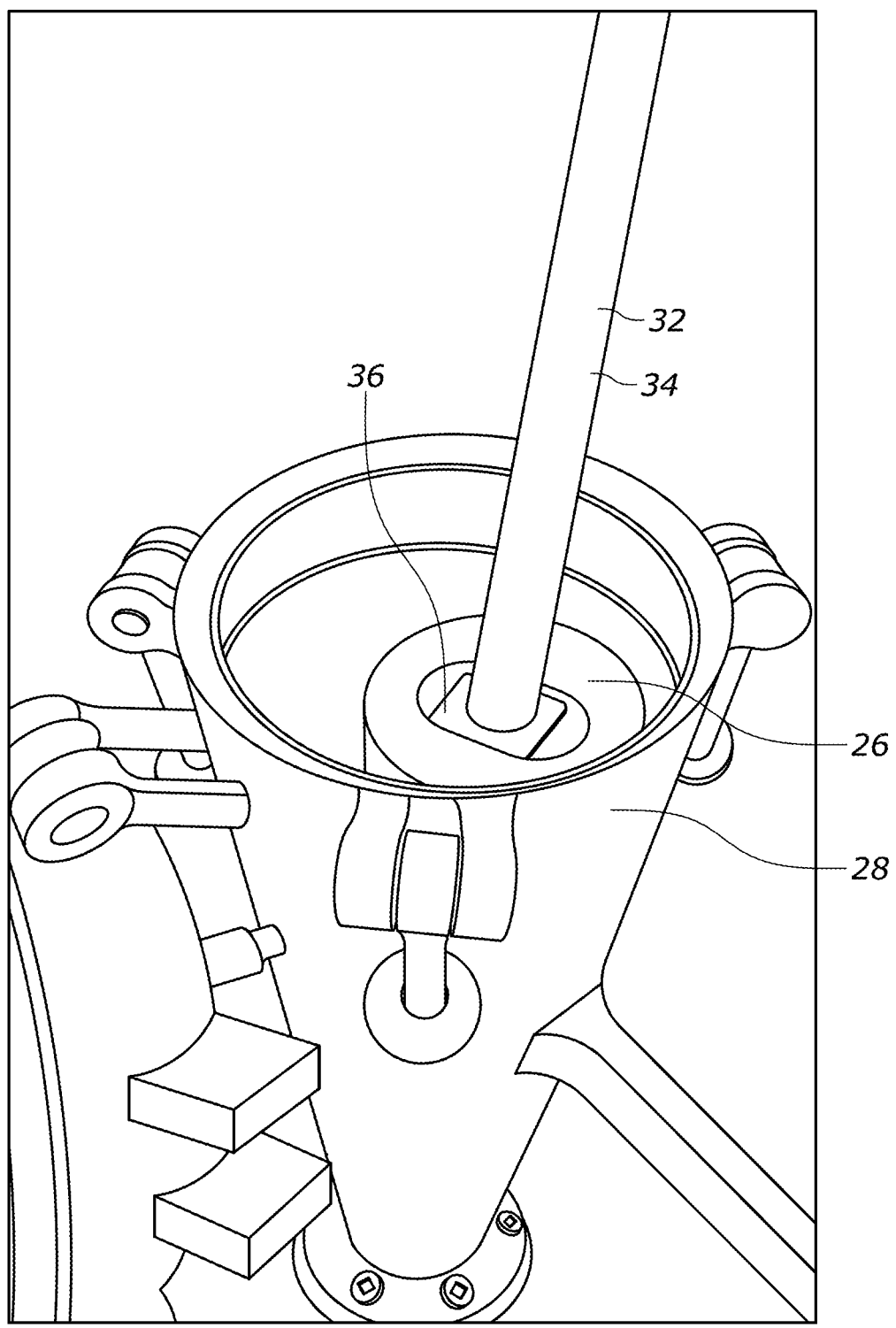
FIG. 4 is another image of a filter installation/removal tool in use with a filter element within a pressure vessel

One example of such a tool 32 is shown in FIGS. 3 and 4. In this embodiment, the elongated filter removal/installation tool 32 may include an elongated portion 34 and a flat plate 36 at one end of the elongated portion 34. The flat plate 36 is configured to removably engage with a recess 38 (shown in FIG. 2) of the elongated filter element 26. To engage the tool 32 with the filter element 26, the flat plate 36 of the tool 32 may first be lowered into the recess 38 of the filter element 26 to the position shown in FIG. 3. Then, a user may rotate the elongated portion 34 of the tool 32, which also results in the flat plate 36 rotating to the position shown in FIG. 4. In the position shown in FIG. 4, the flat plate 36 engages a lip within the recess 38, thereby temporarily securing the tool 32 to the filter element 26. A user may then raise and lower the filter element 26 in and out of the pressure vessel 28 without any body part breaching the plane of the pressure vessel 28 and thereby avoiding OSHA regulations.

Once the filter element 26 has been placed within the pressure vessel 28 (such as shown in FIG. 2), the filter element 26 still ideally should be secured to the threaded rod 30. Conventionally, depending on the type of filter element either a nut and washer assembly or an additional retention plate or dimple washers would be used to secure the filter element to the threaded rod. However, these prior art solutions require a user to once again cross or break the plane of the pressure vessel 28, thereby subjecting the installation/removal process to OSHA regulations. Thus, to avoid reaching a hand into the pressure vessel (and once again avoid OSHA regulations), an elongated locking nut removal/installation tool 40 may be used.

Figure 5:
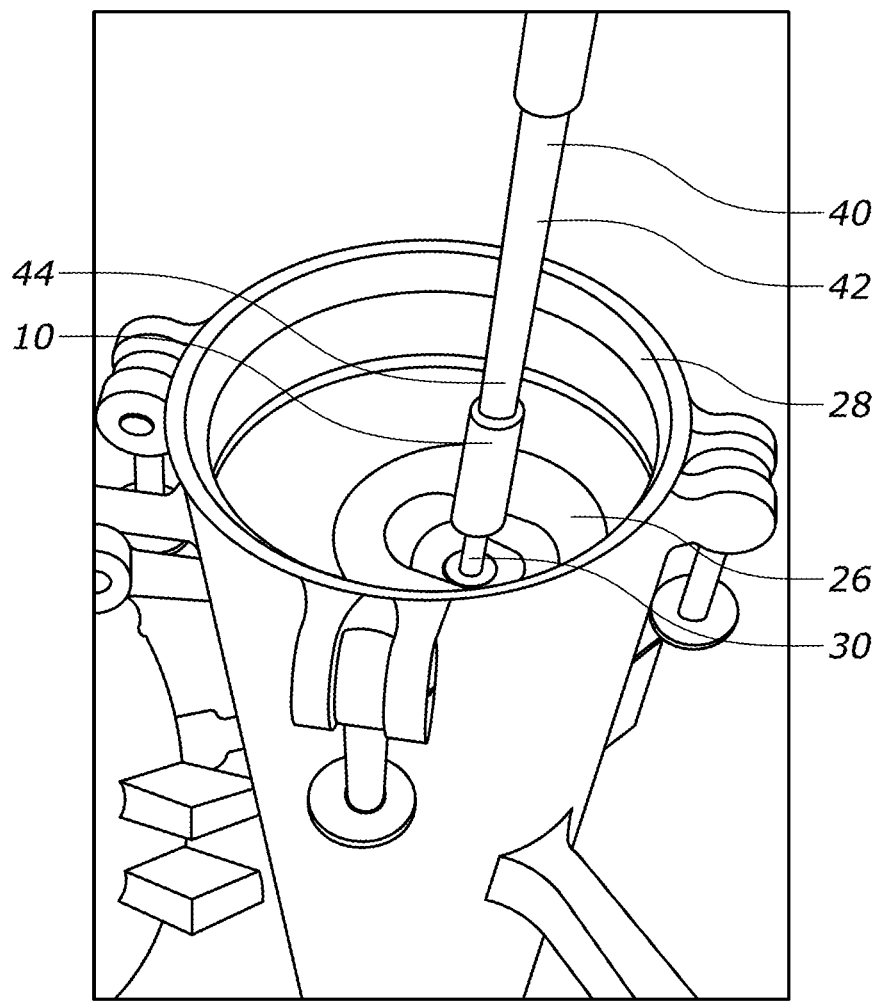
FIG. 5 is an image of a locking nut installation/removal tool in use with a filter locking nut.

One example of such a tool 40 is shown in FIG. 5. The elongated locking nut removal/installation tool 40 may be used to attach and remove the filter locking nut 10a to the threaded rod 30, thereby securing the filter element 26 in place within the pressure vessel 28. The elongated locking nut removal/installation tool 40 may include an elongated portion 42 with a square end 44 and spring ball (not shown, but understood as commonly available) that is configured to engage the first receptacle 18 of the filter locking nut 10a. While this embodiment utilizes an elongated locking nut removal/installation tool 40 with a square end 44 and spring ball, the disclosure is not so limited. The elongated locking nut removal/installation tool 40 may vary in design so long as it is configured to removably engage the first receptacle 18 of the filter locking nut 10a in order to temporarily secure or affix the filter locking nut 10a to the removal/installation tool 40. The temporary securing or affixing is advantageous in that the filter locking nut 10a will not easily disconnect from the removal/installation tool 40 when inserting into or removing from the pressure vessel 28, but will disconnect within the pressure vessel 28 after engaged with the threaded rod 30. Accordingly, there will be no need to break the plane of the pressure vessel 28.

Once the filter element 26 has been inserted into the pressure vessel 28 such as shown in FIG. 2, the filter locking nut 10 may then be installed on the threaded rod 30 to complete installation of the filter element 26. Ideally, the filter locking nut 10a is first temporarily attached to the elongated locking nut removal/installation tool 40 by snapping the square end 44 of the elongated locking nut removal/installation tool 40 into the first receptacle 18 of the filter locking nut 10a. Once secured, the filter locking nut 10a may be inserted into the pressure vessel 28 until the second receptacle 24 is aligned with the threaded rod 30. The filter locking nut 10a may then be secured onto the threaded rod 30 by rotating the elongated locking nut removal/installation tool 40 until the internal threads of the second receptacle 24 of the filter locking nut 10a are fully engaged with the threaded rod 30 and the distal end of the filter locking nut 10a engages the sealing cap of the filter element in order to secure the filter element 26 in place. The elongated locking nut removal/installation tool 40 may then be removed simply by pulling the elongated locking nut removal/installation tool 40 away from the filter locking nut 10a until the square end 44 of the elongated locking nut removal/installation tool 40 disengages from the first receptacle 18 of the filter locking nut 10a.

To subsequently remove the filter element 26 for maintenance or replacement, the opposite method is used. First, the elongated locking nut removal/installation tool 40 may be lowered into the pressure vessel 28 and then engaged with the filter locking nut 10*a* by applying a compressive force to the elongated locking nut removal/installation tool 40 until the square end 44 of the elongated locking nut removal/installation tool 40 snaps into the first receptacle 18 of the filter locking nut 10*a*. Then, the elongated locking nut removal/installation tool 40 is rotated until the internal threads of the second receptacle 24 of the filter locking nut 10*a* are fully disengaged with the threaded rod 30. Since the elongated locking nut removal/installation tool 40 and filter locking nut 10*a* are still engaged, the filter locking nut 10*a* may then be removed from the pressure vessel 28 by pulling the elongated locking nut removal/installation tool 40 out of the pressure vessel 28. The filter element 26 may then be removed from the pressure vessel 28 by using the elongated filter removal/installation tool 32 as described previously. This entire process may be completed without a user ever having to reach a hand past or breaking the plane of the pressure vessel 28, thereby eliminating potential safety hazards and the burdensome OSHA regulations governing entry into confined spaces.

One of skill in the art will recognize that the method or process of installation and removal described above with respect to filter elements that have an integral or attached is likewise applicable to filter elements that have two or both open ends in combination with another embodiment of the filter locking nut 10*b*. When the filter locking nut 10*b* is disposed over the threaded rod 30 it may then be threadingly engaged with the internal threads of the second receptacle 24 by actuation of the removal/installation tool 40, as appropriate for the desired action. After the desired process the removal/installation tool 40 may be disconnected as described above. A separate conventional apparatus or device may be used to install or remove the filter element from the pressure vessel 28 without breaking the plane of the pressure vessel 28. In another embodiment, the shoulder 15 may be configured to snugly fit the end of the filter element 26 so that when the removal/installation tool 40 is temporarily attached to the filter locking nut 10*b* the combination may be maneuvered into or out of the pressure vessel 28, as described above. When the filter element 26 is disposed over the threaded stud 30, the filter locking nut 10*b* may be temporarily connected to the removal/installation tool 40 and maneuvered into position in order to be secured to the threaded rod 30 as described herein. Accordingly, this entire process may be completed without a user ever having to reach a hand past or breaking the plane of the pressure vessel 28, thereby eliminating potential safety hazards and the burdensome OSHA regulations governing entry into confined spaces.

The above examples depict a filter element that is disposed only a few inches below or inside from the plane of the pressure vessel. However, the present invention may be used with pressure vessels and filter elements of varying shapes and sizes, including when a filter element is disposed below or inside several feet past the plane of the pressure vessel. Thus, the length of the installation/removal tools described above may be varied as desired such that a user need not break the plane of the pressure vessel regardless of its design.

The above detailed description and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

The invention claimed is:

1. An filter locking nut comprising:
    an elongated body extending between a first end and a second end, wherein the first end comprises a first receptacle and wherein the second end comprises a second receptacle including an internal thread configured to removably engage a threaded rod in order to be moved into engagement with a filter element:
    wherein the elongated body comprises an outer wall of the first receptacle;
    wherein the first receptacle comprises;
    a rectangular opening,
    a circumferential groove formed in an interior wall of the rectangular opening, and
    a circular back end of the square opening,
    wherein the groove is coupled and remains coupled with an elongated tool when the elongated tool is inserted into the first receptacle and a movable component of the elongated tool disposed in the groove;
    wherein the groove is uncoupled from the elongated tool when the threaded rod engages the second receptacle and the movable component is undisposed from the groove.

2. The filter locking nut of claim 1, wherein the rectangular opening comprises four inner walls and the circumferential groove is formed within each of the four inner walls to removably engage with the elongated tool.

3. The filter locking nut of claim 1, wherein the elongated body has a generally cylindrical shape.

4. The filter locking nut of claim 1, wherein the elongated body further comprises a flange extending laterally from a longitudinal axis of the elongated body.

5. The filter locking nut of claim 4, wherein a wall extends from the flange along the longitudinal axis of the elongated body to define a shoulder between the flange and the wall.

* * * * *